(12) United States Patent
Gao et al.

(10) Patent No.: US 10,761,989 B2
(45) Date of Patent: Sep. 1, 2020

(54) METHOD OF STORAGE MANAGEMENT, STORAGE SYSTEM AND COMPUTER PROGRAM PRODUCT

(71) Applicant: EMC IP Holding Company LLC, Hopkinton, MA (US)

(72) Inventors: Jian Gao, Beijing (CN); Lifeng Yang, Beijing (CN); Xinlei Xu, Beijing (CN); Liam Xiongcheng Li, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 160 days.

(21) Appl. No.: 16/021,286

(22) Filed: Jun. 28, 2018

(65) Prior Publication Data

US 2019/0057035 A1    Feb. 21, 2019

(30) Foreign Application Priority Data

Jun. 30, 2017    (CN) .......................... 2017 1 0523421

(51) Int. Cl.
*G06F 12/0866* (2016.01)
*G06F 3/06* (2006.01)
*G06F 12/0888* (2016.01)

(52) U.S. Cl.
CPC .......... *G06F 12/0866* (2013.01); *G06F 3/061* (2013.01); *G06F 3/0646* (2013.01); *G06F 3/0674* (2013.01); *G06F 12/0888* (2013.01); *G06F 2212/224* (2013.01)

(58) Field of Classification Search
CPC ...... G06F 3/061; G06F 3/0646; G06F 3/0674; G06F 12/0866; G06F 12/0868; G06F 12/0871; G06F 12/0888; G06F 2212/224
See application file for complete search history.

(56) References Cited

U.S. PATENT DOCUMENTS

| | | | |
|---|---|---|---|
| 8,959,284 B1 * | 2/2015 | Boyle | G06F 12/0866 711/113 |
| 9,104,582 B1 * | 8/2015 | Mukundan | G06F 12/0893 |
| 9,229,864 B1 | 1/2016 | Kanteti et al. | |
| 9,280,467 B1 | 3/2016 | Kanteti et al. | |
| 9,575,686 B2 * | 2/2017 | Wu | G06F 3/0683 |
| 9,959,058 B1 | 5/2018 | O'Brien et al. | |
| 9,959,074 B1 | 5/2018 | Shain et al. | |
| 10,261,908 B2 | 4/2019 | Li et al. | |
| 10,339,021 B2 | 7/2019 | Xu et al. | |
| 10,387,308 B2 | 8/2019 | Xu et al. | |
| 10,409,778 B1 | 9/2019 | Zhao et al. | |
| 10,417,137 B2 | 9/2019 | Li et al. | |
| 10,635,348 B2 | 4/2020 | Yang et al. | |

* cited by examiner

*Primary Examiner* — Aracelis Ruiz
(74) *Attorney, Agent, or Firm* — BainwoodHuang

(57) ABSTRACT

Embodiments of the present disclosure provide a method of storage management, a storage system and a computer program product. The method comprises determining whether a number of I/O requests for a first page in a disk of a storage system exceeds a first threshold. The method further comprises: in response to determining that the number exceeds the first threshold, caching data in the first page to a first cache of the storage system; and storing metadata associated with the first page in a Non-Volatile Dual-In-Line Memory Module (NVDIMM) of the storage system.

20 Claims, 12 Drawing Sheets

METHOD OF STORAGE MANAGEMENT, STORAGE SYSTEM AND COMPUTER PROGRAM PRODUCT

RELATED APPLICATIONS

This application claim priority from Chinese Patent Application Number CN 201710523421.6, filed on Jun. 30, 2017 at the State Intellectual Property Office, China, titled "STORAGE MANAGEMENT METHOD, STORAGE SYSTEM AND COMPUTER PROGRAM PRODUCT" the contents of which is herein incorporated by reference in its entirety.

FIELD

Embodiments of the present disclosure relate to the data storage field, and more specifically, to a method of storage management, a storage system and a computer program product.

BACKGROUND

Cache is a special memory subsystem that stores frequently used data to facilitate quick access of the CPU to the data. Therefore, cache guarantees the running speed of the computer. A Dynamic Random Access Memory (DRAM) cache improves computer performance by transparently storing data in the DRAM, so that requests for the data can be handled quickly, normally about 60 µs. However, the cost of the DRAM cache is very expensive, and there is hardware limitation to the DRAM cache's capacity, such as memory slot limitation and battery hold up time limitation.

The Solid-State Disk (SSD) cache improves computer performance by transparently storing data in SSD, so that requests for that the data can be handled relatively fast, normally less than 1 ms. Compared with the DRAM cache, the cost of the SSD cache is lower and its capacity is higher. However, there exists a problem concerning waste of SSD disks in the existing SSD cache solution, which increases user cost to a certain extent.

SUMMARY

Embodiments of the present disclosure provide a storage management solution.

According to a first aspect of the present disclosure, there is provided a method of storage management. The method can comprise determining whether a number of I/O requests for a first page in a disk of a storage system exceeds a first threshold. The method can further comprise: in response to determining that the number exceeds the first threshold, caching data in the first page to a first cache of the storage system; and storing metadata associated with the first page in a Non-Volatile Dual-In-Line Memory Module (NVDIMM) of the storage system.

According to a second aspect of the present disclosure, there is provided a storage system. The storage system can comprise a Non-Volatile Dual-In-Line Memory Module (NVDIMM); a disk; a first cache; and a controller. The controller can be configured to determine whether a number of I/O requests for a first page in the disk exceeds a first threshold. The controller can further be configured to in response to determining that the number exceeds the first threshold, cache data in the first page to the first cache; and store metadata associated with the first page in the NVDIMM.

According to a third aspect of the present disclosure, there is provided a computer program product. The computer program product is tangibly stored on a non-volatile computer readable medium and comprises machine-executable instructions, when executed, causing a machine to perform steps of the above mentioned storage management method.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of the present disclosure will become more apparent through the following more detailed description of the example embodiments of the present disclosure with reference to the accompanying drawings, in which the same reference sign usually refers to the same component in the example embodiments of the present disclosure.

DETAILED DESCRIPTION OF EMBODIMENTS

Figure 1:
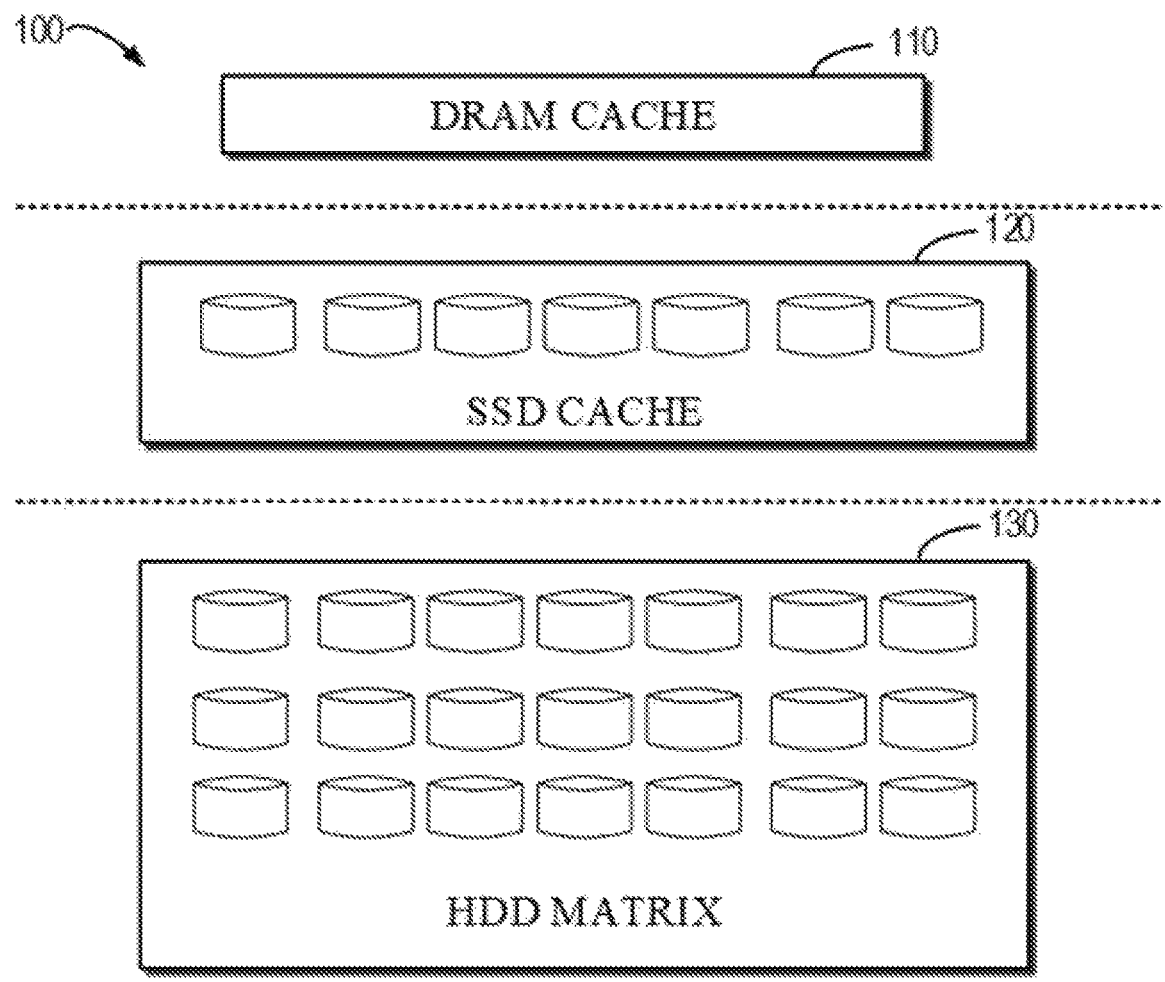
FIG. 1 illustrates a schematic diagram of a conventional storage environment including a cache.

The principle of the present disclosure will be described with reference to the several example embodiments shown in the drawings. Although the drawings illustrate example embodiments of the present disclosure, it should be understood that the embodiments are described merely to enable those skilled in the art to better understand and further implement the present disclosure and is not intended for limiting the scope of the present disclosure in any manner.

FIG. 1 illustrates a schematic diagram of a conventional storage environment 100 including a cache. The environment 100 includes a Dynamic Random Access Storage (DRAM) cache 110, a Solid-State Disk (SSD) cache 120 and a Hard Disk Drive (HDD) matrix 130. Normally, the DRAM cache 110 is at the top of the IO data path, the SSD cache 120 is under the DRAM cache 110, and the HDD matrix is below the SSD cache 120.

The DRAM cache 110 improves performance by transparently storing data in the DRAM, so that requests for the data can be handled quickly, normally about 60 μs. The DRAM cache 110 usually caches the most frequently accessed data (hottest data). However, the cost of the DRAM cache is very expensive, about 8-10 U.S. dollars per GB. And there is hardware limitation to the DRAM cache's capacity, such as memory slot limitation and battery hold up time limitation. The capacity of DRAM cache is generally about tens of GBs.

The SSD cache 120 improves performance by transparently storing data in SSD, so that requests for the data can be handled relatively fast, normally less than 1 ms. The SSD cache 120 usually caches the second most frequently accessed data. Compared with the DRAM cache, the cost of the SSD cache is lower and the capacity is higher. For the SSD cache, the cost per GB is from less than one U.S. dollar to several U.S. dollars depending on the employed technology. Normally, the capacity of the SSD cache is about hundreds of GBs or TBs.

SSD has different technologies for example, SSD with high endurance (HE) implemented using Single Level Cell (SLC) technology, SSD with medium endurance (ME) implemented using Multi-Level Cell (MLC) technology and SSD with low endurance (LE) implemented using Three-Level Cell (TLC). These different technologies have different characteristics. For example, HE SSD can bear up to 30 write/day, ME SSD can only have 10 write/day and LE SSD can have less than 5 write/day.

The HDD matrix 130 is comprised of HDDs for storing all user data and serving the I/O requests that are not handled by the DRAM cache 110 and the SSD cache 120, and providing the slowest response time. A plurality of HDDs forms a disk array to provide open capacity and redundancy. Some disk arrays can provide capacity of hundreds of TBs even PBs.

In the environment 100 shown in FIG. 1, there are two types of cache hits, i.e., DRAM cache hit and SSD cache hit. For an incoming I/O request, the DRAM cache 110 will firstly search its cached data. If the DRAM cache 110 finds hit, it responds to the I/O request using the cached data. Otherwise, if the DRAM cache 110 finds miss, it will forward the I/O request to the SSD cache 120.

In response to receiving the I/O request forwarded by the DRAM cache 110, the SSD cache 120 will search its cached data. If the SSD cache 120 finds hit, it responds to the I/O request using the cached data. Otherwise, if the SSD cache 120 finds miss, it will forward the I/O request to the HDD matrix 130. Afterwards, data is read from or written into the SSD matrix 130.

Figure 2:
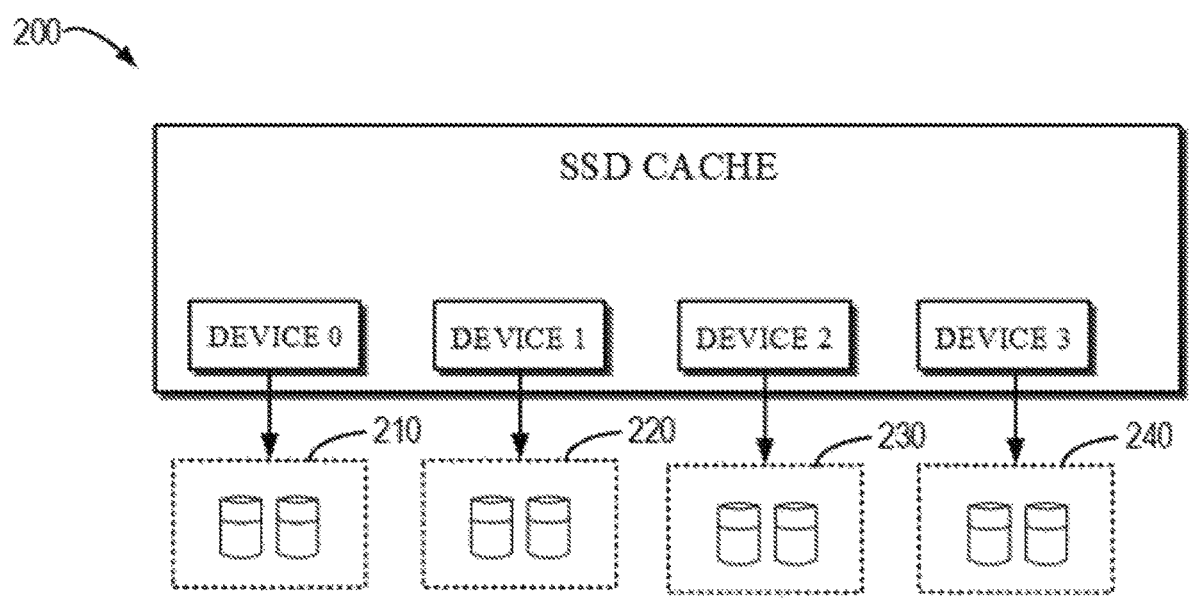
FIG. 2 illustrates a schematic diagram of an existing SSD cache.

FIG. 2 illustrates a schematic diagram of an existing SSD cache 200, which can act as the SSD cache 120 in the environment shown in FIG. 1. The SSD cache 200 is a read/write cache. If a write operation is performed on the SSD cache 200, there will exist a dirty page (i.e., data is already written into the cache, but not written back to the disk yet). Therefore, in order to ensure that there is no data loss, the existing SSD cache 200 uses the redundant array of independent disks (RAID) to protect the data. Two SSDs are combined into one RAID-1 group, and the SSD cache 200 regards the RAID-1 group consisting of two SSDs as one device. In FIG. 2, it illustrates the RAID-1 group 210, 220, 230 and 240 and the cache 200 treats them as device 0, device 1, device 2 and device 3. Each SSD is stored with frequently accessed data and metadata associated with the stored data.

Because the existing SSD cache is a read/write cache, there is endurance requirement (i.e., the count of writes that can be borne by the SSD) and it is required to support over 25 write/day. Thus, it needs to use the expensive HE SSD in the SSD cache 200 and over-provision 50% space to support that requirement. This wastes the expensive ME SSD and increases user costs.

Figure 3:
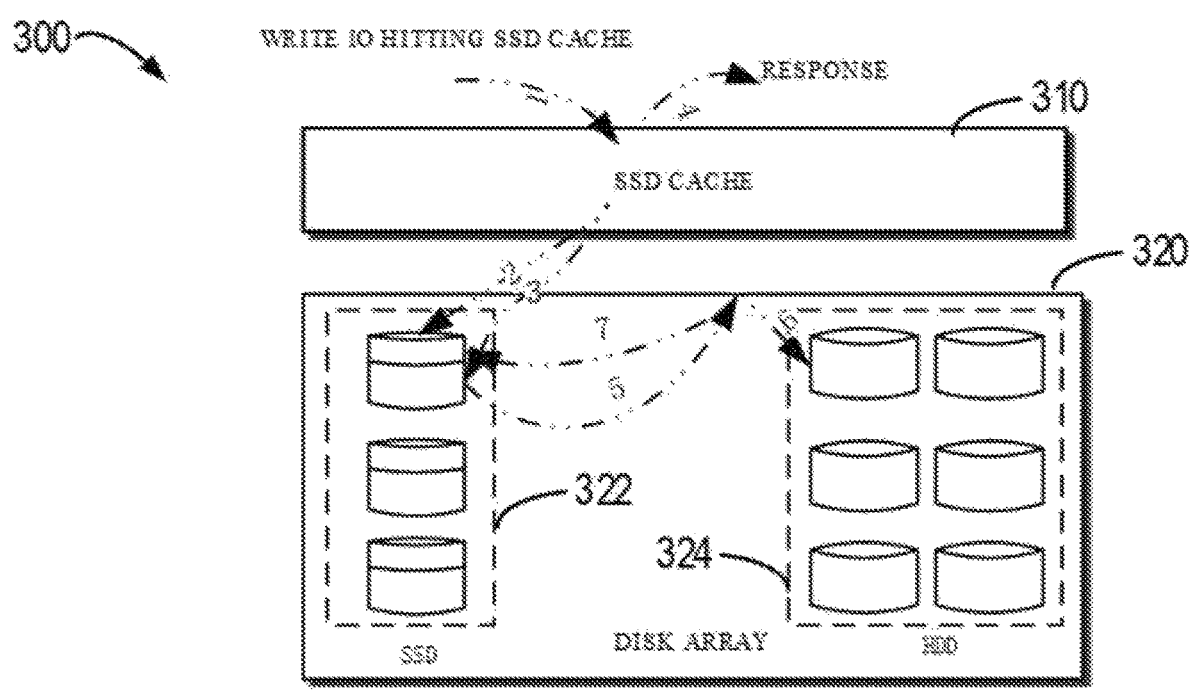
FIG. 3 illustrates a schematic diagram of a process of handling cache hit in the existing SSD cache.

The problems of the existing SSD cache discovered by the inventor through research will be described in details with reference to FIG. 3. Specifically, FIG. 3 illustrates a schematic diagram of a process of handling cache hit in the existing SSD cache shown in FIG. 2. In the existing SSD cache design 300, the metadata associated with the cached page is stored in the SSD 322. If there is a write request and it hits a page cached by the SSD cache 310, the cached page first turns into a dirty page, which is then changed to a clean page by the background service. The detailed process is as follows:

Action 1. The SSD cache 310 discovers a hit on the cached page and jumps to action 2.

Action 2. The metadata associated with the cached page is modified from a clean page into a dirty page. Because the metadata associated with the cached page is stored in the SSD 322 in the existing SSD cache design 300, there is one write to the SSD 322 during the modification of metadata.

Action 3. Data involved in the write request is written into the SSD 322. During the process, there is one write to the SSD 322.

Action 4. A response is made to the write request.

Action 5. The background service discovers that there is a dirty page in the SSD cache and starts to flush the dirty page to the HDD. During the process, the background service reads data from the SSD first (there is one read from the SSD).

Action 6. The background service writes the data read from the SSD 322 in Action 5 into the HDD 324, so there is one write to the HDD 324.

Action 7. The metadata associated with the cached page in the SSD 322 is modified from dirty page to clean page. In this step, there is one write to the SSD 322.

As shown in FIG. 3, one SSD cache hit will cause five internal I/O operations, in which there are three writes to the SSD 322 and one read from the SSD 322. However, two out of the three writes to the SSD 322 are operations performed on the metadata associated with the cache page. As can be seen, because there are too many writes to the SSD 322 in the existing SSD cache design 300, the use of the expensive HE SSD may be inevitable in order to satisfy the endurance requirements. Besides, too many write counts may impact the response speed to the I/O request, thereby influencing the number of I/O requests handled per unit time.

Example embodiments of the present disclosure provide a solution for implementing a hybrid SSD cache with a Non-Volatile Dual-In-Line Memory Module (NVDIMM). In the solution, an NVDIMM device is used to store the metadata associated with the page cached by the SSD cache. Since the metadata associated with the cached page is stored on the NVDIMM instead of SSD, for one write request that hits the SSD cache, the modification of metadata will occur on the NVDIMM, rather than the SSD, thereby reducing the number of writes to the SSD. Thus, the comparatively cheap ME SSD and LE SSD can be adopted to build the SSD cache without all using the expensive HE SSD.

Furthermore, according to the embodiments of the present disclosure, HE SSD or ME SSD, can be combined into an RAID group, such as RAID-1 group, to provide write cache. There are at least two SSDs in the RAID-1 group, such that if one SSD malfunctions, data loss can be avoided. A single LE SSD can serve as a read cache. Because the LE SSD is just a read cache, the data in the LE SSD is all clean, and there is no data loss when the LE SSD malfunctions. Accordingly, it is unnecessary to organize the LE SSD in the form of RAID. In this way, the present disclosure takes full advantage of different characteristics of different SSD technologies and implements the hybrid SSD cache with SSDs having different endurance. Therefore, larger capacity is provided and the performance of the SSD cache is improved while user cost is reduced.

Figure 4:
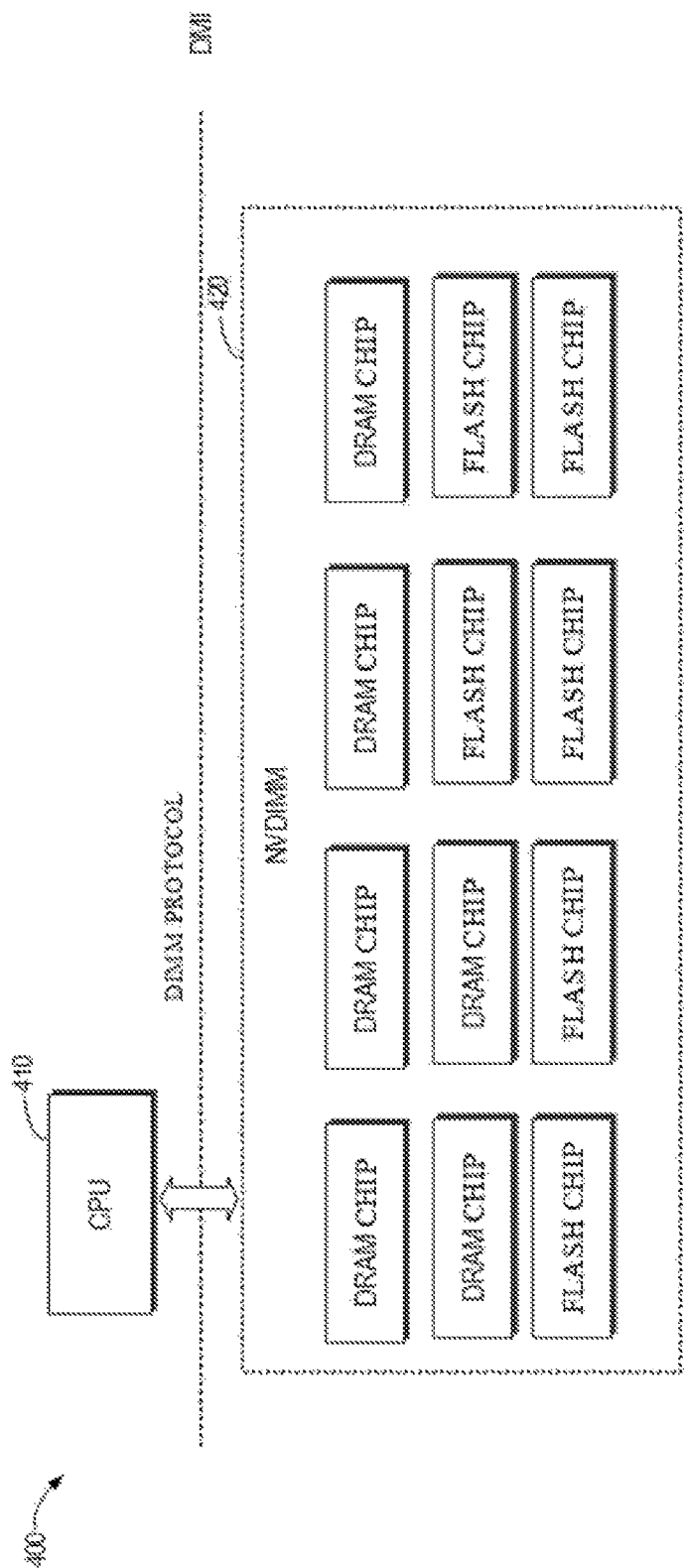
FIG. 4 illustrates a schematic diagram of a Non-Volatile Dual-In-Line Memory Module (NVDIMM) device having a flash chip.

The NVDIMM for storing metadata associated with the cached page in the present disclosure is now described with reference to FIG. 4. FIG. 4 illustrates a schematic diagram of a Non-Volatile Dual-In-Line Memory Module (NVDIMM) device 400 having a flash chip. The NVDIMM is a random access memory for computers. "Non-volatile" means that the memory retains its contents even when electrical power is removed either from an unexpected power loss, system crash, or normal shutdown. "Dual in-line" represents the DIMM package is used. NVDIMMs improve application performance, data security, and system crash recovery time. As shown in FIG. 4, the NVDIMM module 420 communicates with the CPU 410 via a Direct Media Interface DMI using the DIMM protocol. The NVDIMM module 420 can be implemented in the form of a flash chip. In the embodiments of the present disclosure, the endurance and reliability of the SSD is enhanced by storing metadata associated with the page cached in the SSD cache into the NVDIMM 420.

Figure 5:
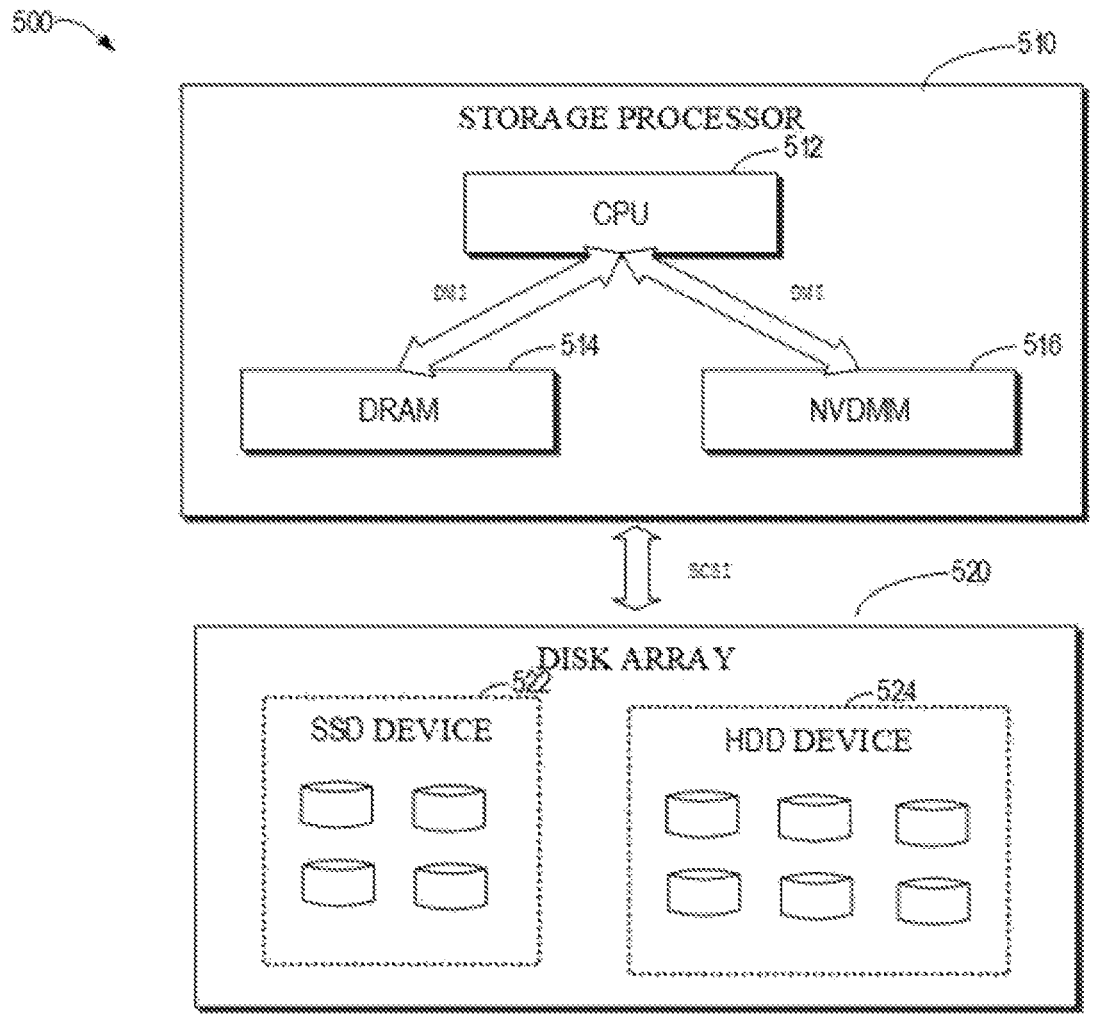
FIG. 5 illustrates a schematic diagram of a storage system according to example embodiments of the present disclosure.

FIG. 5 illustrates a schematic diagram of a storage system 500 according to the example embodiments of the present disclosure. It should be appreciated that some components shown in FIG. 5 can be omitted and the storage system 500 in other embodiments can also comprise other components not shown here. That is, the block diagram described in FIG. 5 is only for describing the embodiments of the present disclosure in an example environment to facilitate those skilled in the art to understand the mechanism and the principle described herein without any intentions of limiting the scope of the present disclosure in any manner.

The storage system 500 includes a storage processor 510 and a disk array 520. The storage processor 510 includes a central processing unit (CPU) 512, a DRAM 514 and an NVDIMM 516. Both the DRAM 514 and the NVDIMM 516 communicate with the CPU 512 via a DMI interface. There are two storage spaces inside the storage processor 510, i.e., storage space provided by the DRAM 514 and storage space provided by the NVDIMM 516. As described above, the NVDIMM 516 is used for storing metadata associated with the page cached in the SSD device 522.

The disk array 520 includes an SSD device 522 and an HDD device 524 and communicates with the storage processor 510 through a Small Computer System Interface (SCSI). In the example embodiments of the present disclosure, the SSD device 522 caches the frequently accessed pages and the HDD device 524 stores all user data. The storage processor 510 can be configured to determine whether the number of the I/O requests for the page in the HDD device 524 exceeds a threshold. The storage processor 510 can also be configured to cache data in the page to the SSD device 522 in response to determining that the number exceeds the threshold, and store the metadata associated with the page into the NVDIMM 516.

As the metadata associated with the page cached by the SSD device 522 is stored in the NVDIMM 516 instead of the SSD device 522 per se, SSDs with different endurance can be utilized to build a hybrid SSD cache in the example embodiments of the present disclosure. The hybrid SSD cache implemented by the embodiments of the present disclosure will be described in details with reference to FIG. 6.

Figure 6:
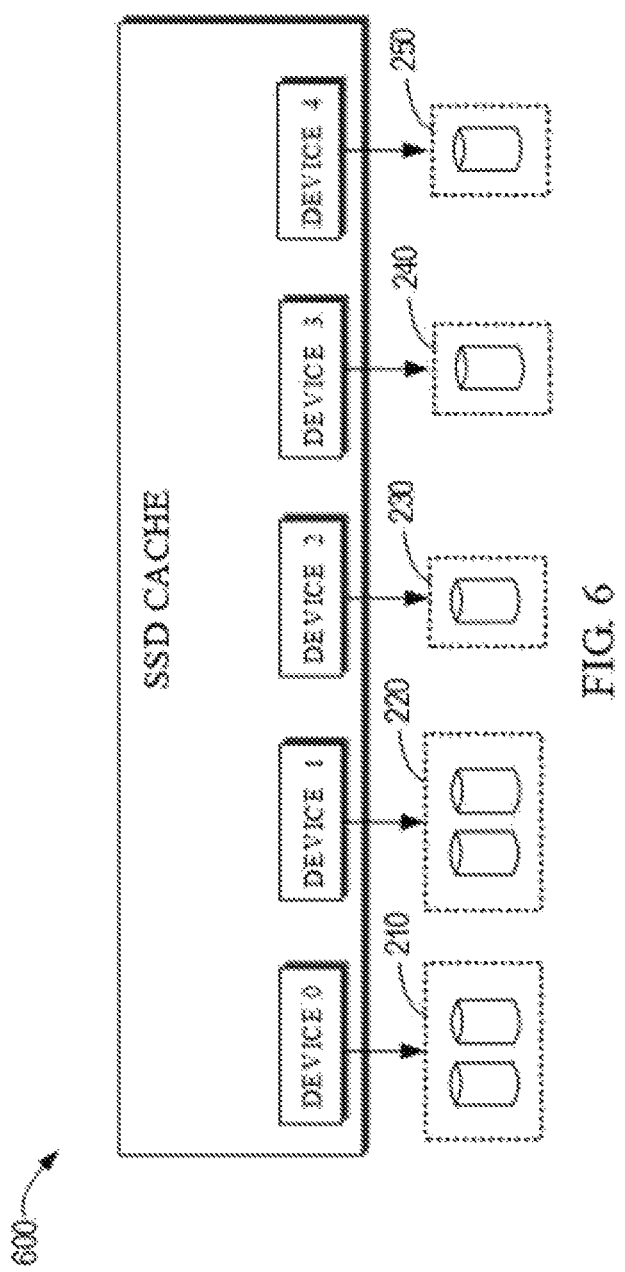
FIG. 6 illustrates a schematic diagram of an SSD cache according to embodiments of the present disclosure.

FIG. 6 illustrates a schematic diagram of a hybrid SSD cache 600 according to embodiments of the present disclosure. The hybrid SSD cache 600 can comprise a first SSD cache 230, 240, 250 (i.e., device 2, device 3, device 4) and a second SSD cache 210, 220 (i.e., device 0, device 1). Only three first SSD caches and two second SSD caches are shown for brevity, but those skilled in the art should understand that any number of first SSD caches and second SSD caches can be included without deviating from the scope of the present disclosure.

In the example embodiments of the present disclosure, the metadata associated with the cached page stored in the first SSD cache 230, 240, 250 is stored in the NVDIMM module. As the metadata is not stored in the first SSD cache 230, 240, 250, the first SSD cache 230, 240, 250 can be read caches, such that the first SSD cache 230, 240, 250 is stored with clean pages only. Each of the first SSD caches 230, 240, 250 can only include a single LE SSD without employing the RAID technology to implement redundancy. Moreover, as the first SSD cache 230, 240, 250 is stored only with clean pages, it will not result into data loss even if a single LE SSD fails (because the clean pages are still stored on the disk).

The second SSD cache 210, 220 can be write caches. To prevent data loss, each of the second SSD caches 210, 220 can have at least two SSDs, such as HE SSDs or ME SSDs. The at least two SSDs are designed as RAID-1 group to avoid data loss. As depicted above, the metadata associated with the page cached in the second SSD caches 210, 220 is stored in the NVDIMM module, which can reduce the number of writes to the second SSD caches 210, 220, such that the second SSD caches 210, 220 can satisfy the endurance requirements using the comparatively cheap ME SSD instead of the expensive HE SSD.

In the hybrid cache 600 shown in FIG. 6, by storing the metadata associated with the cached page in the NVDIMM instead of SSD, the cheap LE SSD which can only bear fewer write counts (i.e., with low endurance) can act as the read cache to store clean pages only, and the ME SSD or HE SSD, which is relatively expensive and stronger in endurance, can serve as the write cache in the form of RAID-1 to store dirty pages, so as to fully exploit characteristics of various SSDs. In the context of the same hardware cost, an SSD cache system with larger capacity can be provided. In another aspect, because the metadata is normally small, the update of the metadata in the NVDIMM can be rapidly completed, thereby improving I/O response time. In brief, the solution of the present disclosure enhances endurance of the entire SSD cache system and improves system performance with the NVDIMM.

Figure 7:
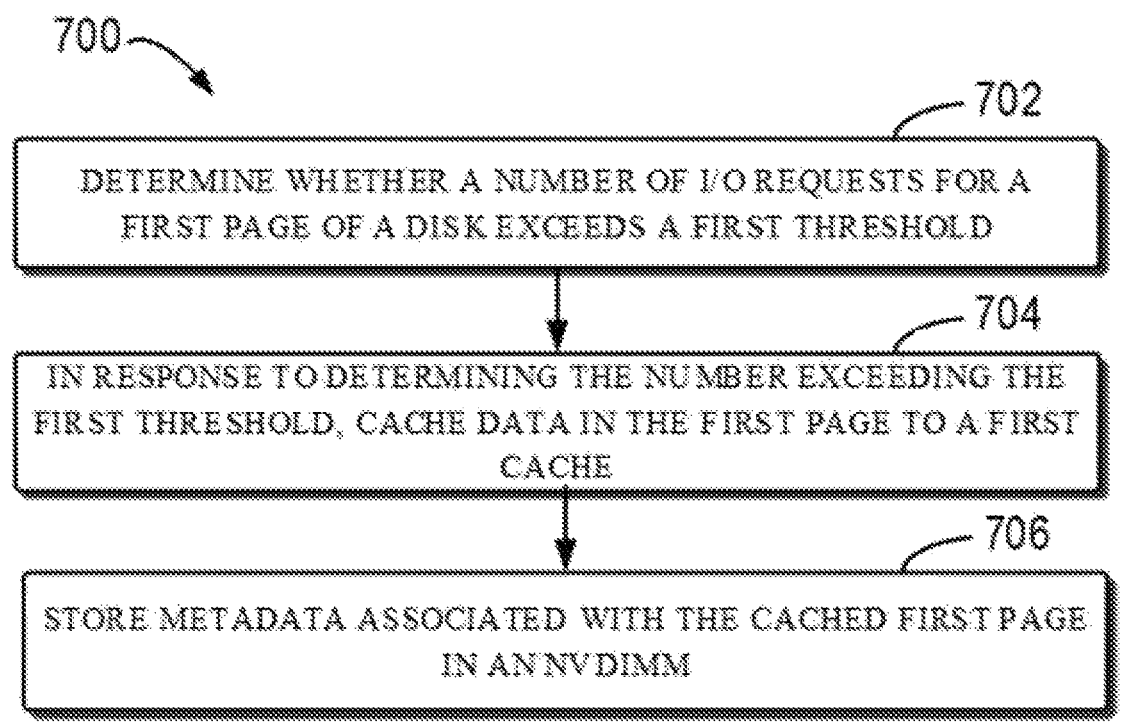
FIG. 7 illustrates a flowchart of a method of storage management according to example embodiments of the present disclosure.

FIG. 7 illustrates a flowchart of a method 700 of storage management according to example embodiments of the present disclosure. At block 702, it can be determined whether the number of I/O requests for a first page of a disk of the storage system exceeds a first threshold. For example, the number can be determined by counting the I/O requests for the first page within a predefined time period.

At block 704, data in the first page can be cached to the first cache of the storage system in response to determining that the number exceeds the first threshold. In the example embodiments, the first cache can include a SSD with low endurance, e.g., LE SSD, for storing clean pages. At block 706, metadata associated with the first page can be stored in the NVDIMM of the storage system. The metadata associated with the first page can contain status of the first page (clean pages or dirty pages), mapping information associated with the first page and the like. In the example embodiments, metadata indicating that the first page is a clean page can be stored in the NVDIMM.

In the method 700, as the metadata associated with the cached page is stored in the NVDIMM, rather than the first cache, operations for metadata occur on the NVDIMM instead of the first cache. Thus as compared with the existing solution, the writes associated with the I/O requests for the first cache can be reduced. Accordingly, the first cache can be implemented with SSD with low endurance, thereby reducing user cost. Besides, because the NVDIMM is located inside the storage processor and the metadata is normally small, the update of the metadata can be rapidly completed, which further improves the response time of the I/O requests and increases the number of I/O requests handled per unit time.

Figure 8:
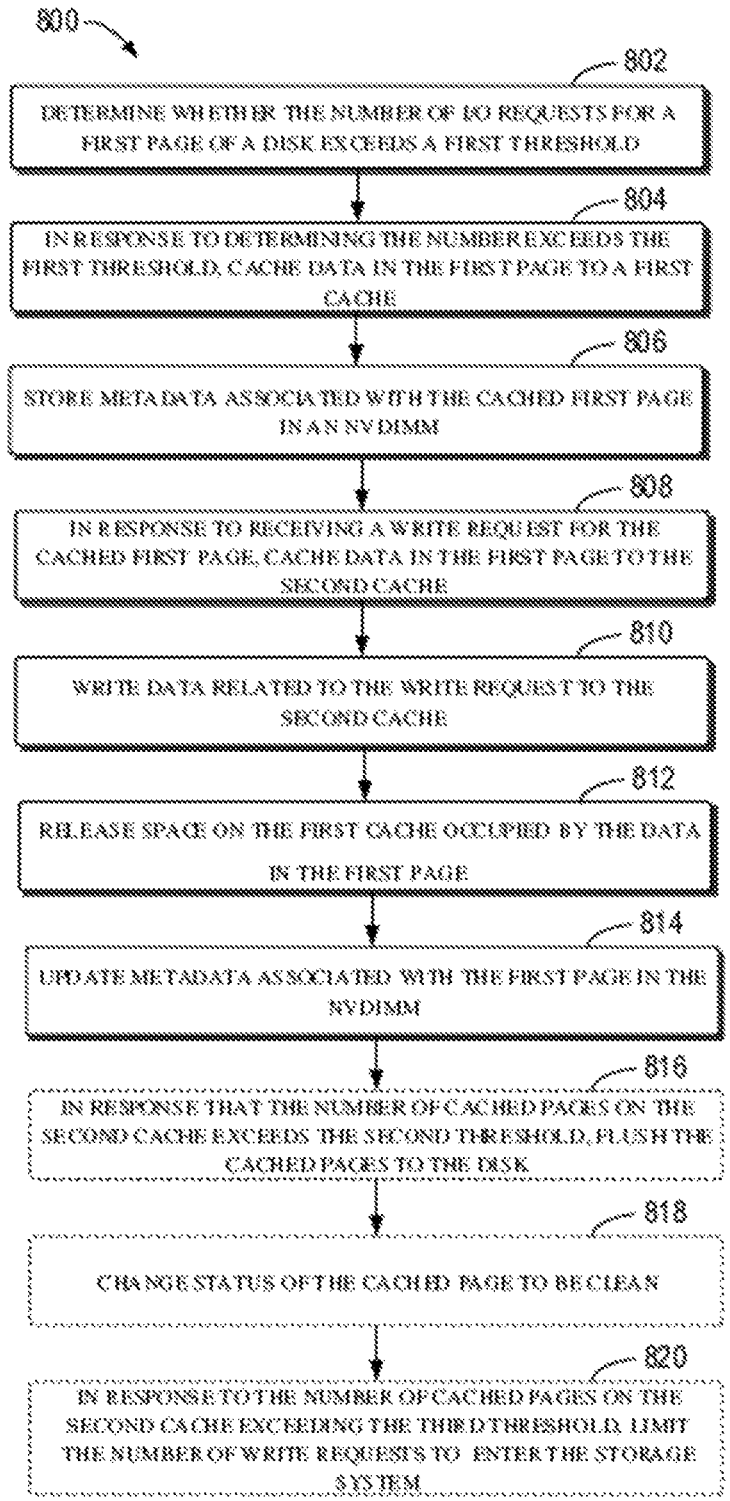
FIG. 8 illustrates a flowchart of a method of storage management according to example embodiments of the present disclosure.

FIG. 8 illustrates a flowchart of a storage management method 800 according to example embodiments of the present disclosure. The method 800 is a further improvement of the method 700 shown in FIG. 7. At block 802, it can be determined whether the number of I/O requests for a first page of a disk of the storage system exceeds a first threshold. At block 804, the data in the first page can be cached to the first cache of the storage system in response to determining that the number exceeds the first threshold. At block 806, the metadata associated with the first page can be stored in the NVDIMM of the storage system. The blocks 802, 804 and 806 are respectively similar to the blocks 702, 704 and 706 in FIG. 7.

At block 808, in response to receiving a write request for the cached first page, data in the first page is cached to the second cache. In the example embodiments, the first cache can be a read-preference cache and the second cache can be a write cache. The first cache can include an SSD with low endurance, e.g., LE SSD. The second cache can contain at least two SSDs with high endurance that are organized into RAID, such as ME SSD or HE SSD.

At block 810, data related to the write request can be written into the second cache. For example, storage space in the second cache can be allocated to the data, and the data is written into the allocated storage space. At block 812, the storage space on the first cache occupied by the data in the first page can be released.

At block 814, the metadata associated with the first page in the NVDIMM can be updated. In the example embodiments, the status of the first page can be modified to dirty page. The mapping information associated with the first page can be modified to indicate that the first page is mapped to the second cache.

In the method 800, metadata associated with the cache page is stored in the NVDIMM, clean pages are cached to the first cache (e.g., LE SSD), and dirty pages are cached to the second cache (such as ME SSD or HE SSD). Therefore, the modification of the metadata occurs in the NVDIMM instead of the caches, which can reduce the number of writes to the SSD, such that comparatively cheap SSDs with low endurance can be used in the cache without all using the expensive SSDs with high endurance. Besides, dirty data loss can be avoided since the second cache storing the dirty page is organized in the form of RAID.

In the example embodiments, in order to reduce the overhead of moving data between the cache and the disk and reduce the update to the metadata in the NVDIMM device, on-demand flush strategy can be adopted, i.e., setting up a flushing threshold and a throttling threshold for the second cache. These cached pages in the second cache are flushed to the disk only when the number of cached pages in the second cache exceeds the flushing threshold. If the number of cached pages in the second cache exceeds the throttling threshold, the number of I/O requests to enter the second cache will be limited. Regarding this, the method 800 can also include optional blocks 816, 818 and 820.

At the optional block 816, the cached pages can be flushed to the disk in response the number of cached pages on the second cache exceeding a second threshold (i.e., flushing threshold). For example, if the storage space occupied by the cached dirty page in the second cache is over 80% of the total storage space of the second cache, flushing the dirty page to the hard disk can begin. At the optional block 818, the status of the cached pages that are already flushed to the disk can be modified to clean page.

At the optional block 818, the number of write requests to enter the second cache can be limited in response to the number of cached pages on the second cache exceeding a third threshold (i.e., throttling threshold). An indication can be sent to the upper layer driver to limit the number of write requests entering the second cache, such that the upper layer driver can send less write requests to the second cache. The number of write requests to enter the second cache can also be limited by delaying a response to the write requests entering the second cache.

Figure 9:
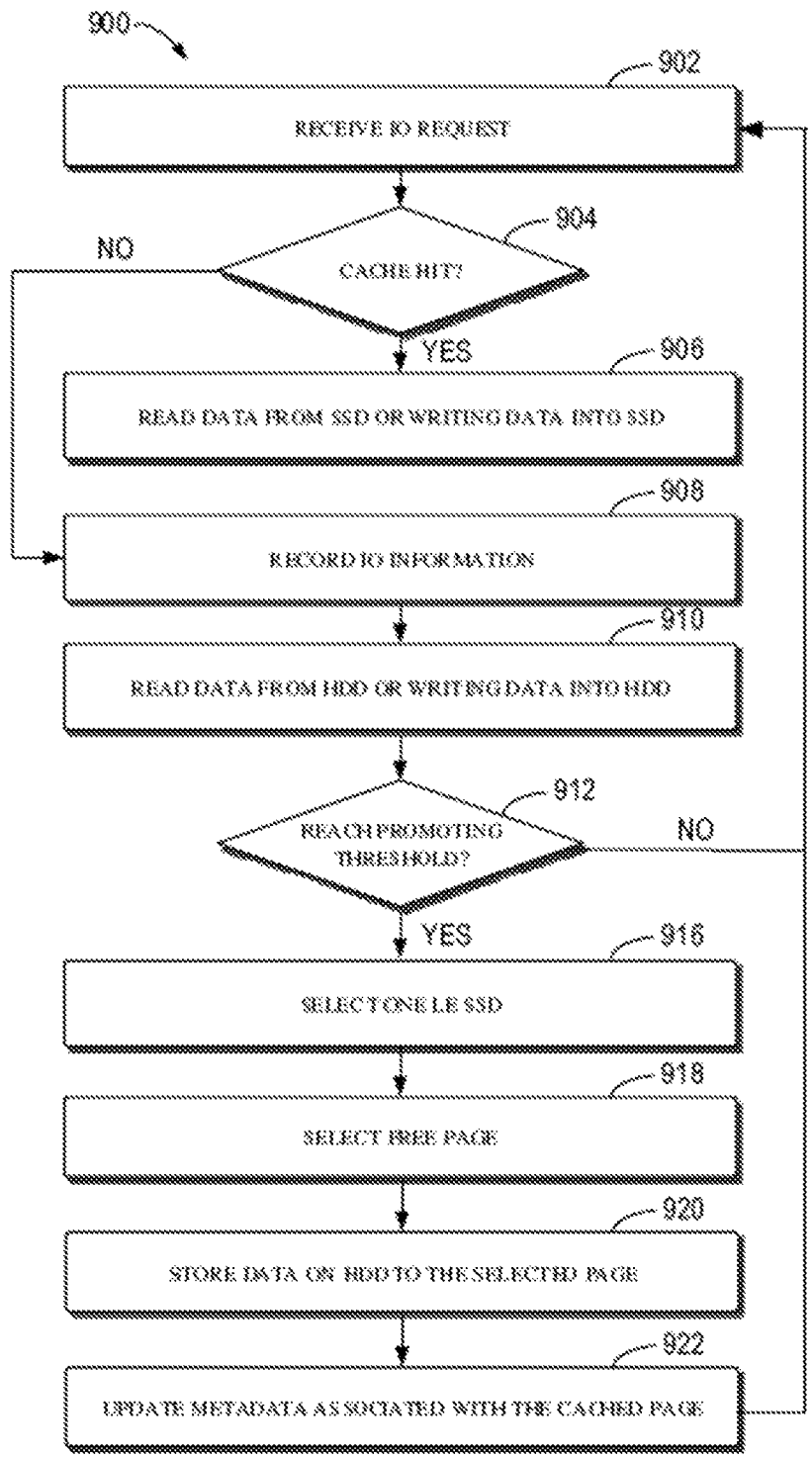
FIG. 9 illustrates a flowchart of a method for caching data stored in pages on the disk to the SSD cache according to example embodiments of the present disclosure.

FIG. 9 illustrates a flowchart of a method 900 for caching pages on the HDD to the SSD cache according to example embodiments of the present disclosure. The method 900 is a specific implementation of the method 700 shown in FIG. 7. It should be understood that the method 700 is not only limited to such implementation. In the method 900, if the SSD cache discovers that some data satisfies the condition for promoting to the SSD cache, it can first promote the data to the LE SSD. The detailed process is described below.

At block 902, an I/O request for a page can be received. At block 904, it can be determined whether the I/O request hits the SSD cache or not. If the I/O request is determined to hit the SSD cache at block 904, the method 900 can proceed to block 906. At block 906, the data targeted by the I/O request can be read from the SSD cache or the data related to the I/O request can be written into the SSD cache.

If the I/O request is determined to miss the SSD cache at block 904, the method 900 can proceed to block 908. At block 908, the information of the I/O request can be recorded, such as recording the page targeted by the I/O request, access frequency of the page and the like. At block 910, data can be read from the HDD or written into the HDD. At block 912, it can be determined whether the page reaches a promoting threshold based on the access frequency of the page. The promoting threshold represents that the page needs to be promoted to the SSD cache. If it is determined that the promoting threshold is not reached at block 912, the method 900 can proceed to block 902 to continue receiving the next I/O request.

Figure 10:
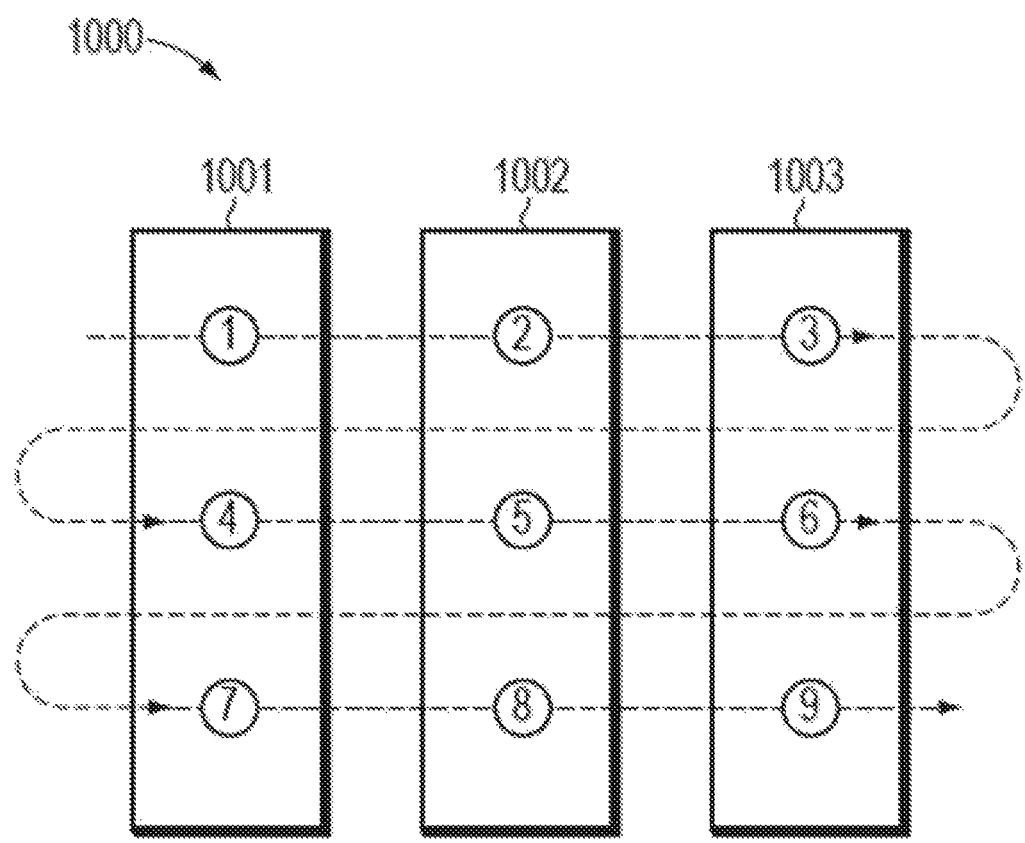
FIG. 10 illustrates a schematic diagram of a round robin method employed in the method shown in FIG. 9.

If it is determined that the promoting threshold has already been reached at block 912, the method can proceed to block 916. At block 916, one LE SSD from a plurality of LE SSDs of the SSD cache can be selected using a round robin method. FIG. 10 illustrates a schematic diagram of a round robin method 1000. In FIG. 10, it is assumed that the SSD cache has three LE SSDs, i.e., first SSD 1001, second SSD 1002 and third SSD 1003. The round robin method comprises: selecting the first SSD 1001 at the first time, selecting the second SSD 1002 at the second time, selecting the third SSD 1003 at the third time, selecting the first SSD 1001 at the fourth time, selecting the second SSD 1002 at the fifth time, selecting the third SSD 1003 at the sixth time, selecting the first SSD 1001 at the seventh time, selecting the second SSD 1002 at the eighth time, selecting the third SSD 1003 at the ninth time, and so on.

At block 918, a free page can be selected from the selected LE SSD. At block 920, the data on HDD targeted by the I/O request can be cached to the selected free page. At block 922, metadata associated with the cached data in the NVDIMM module can be updated.

In the method 900 shown in FIG. 9, only one write to the LE SSD is required to promote the page to the LE SSD, and metadata will be updated directly into the NVDIMM via the DMI through the DMI protocol. Therefore, LE SSD with low endurance can also be applied to the SSD cache.

Figure 11:
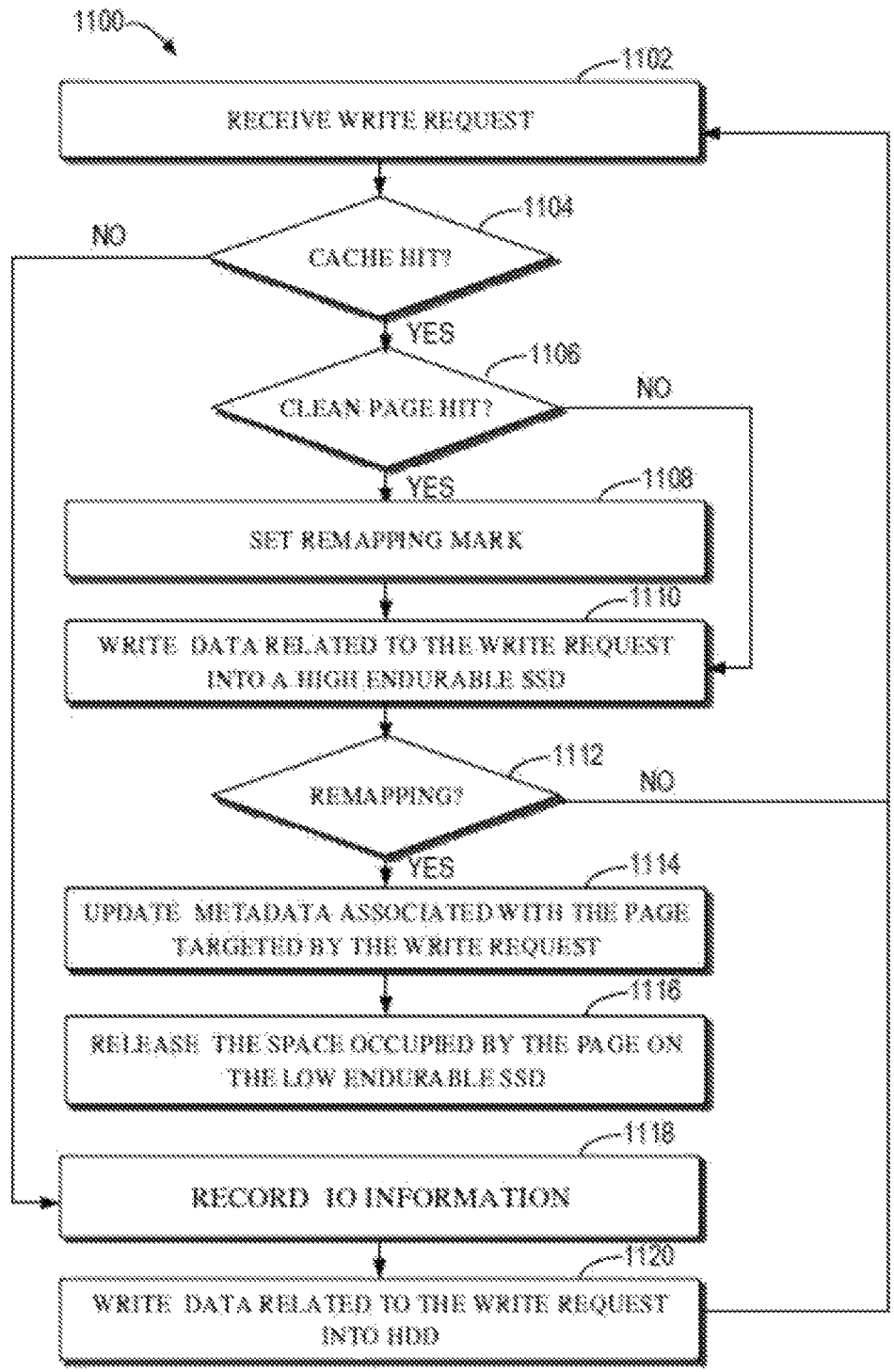
FIG. 11 illustrates a flowchart of a method for caching a data cached on a SSD with low endurance to a SSD with relatively higher endurance according to example embodiments of the present disclosure.

FIG. 11 illustrates a flowchart of a method 1100 for caching a page cached on a SSD with low endurance to a SSD with relatively higher endurance according to example embodiments of the present disclosure. The method 1100 is a specific implementation of block 808-block 814 of the method 800 shown in FIG. 8. It should be understood that block 808-block 814 of the method 800 is not only limited to such implementation.

At block 1102, a write request for a page can be received. At block 1104, it can be determined whether the write request hits the SSD cache. If it is determined that the SSD cache is missed, the method 1100 can proceed to the block 1118, at which information of the write request can be recorded, such as the page targeted by the write request, access frequency of the page and the like. At block 1120, the data related to the write request can be written into the HDD.

If it is determined that the SSD cache is hit at block 1104, the method 1100 can proceed to block 1106, at which it can be determined whether the hit page is a clean page cached in the LE SSD. If the hit page is determined to be the clean page cached in the LE SSD at block 1106, the method 1100 can proceed to block 1108; otherwise, the method 1100 can proceed to block 1110.

At block 1108, a remapping sign representing the need of remapping the hit page is set. At block 1110, data related to the write request is written into the SSD with high endurance in the form of RAID-1 group. At block 1112, it can be determined whether to remap the hit page by judging whether the remapping sign is set. If remapping is determined to be unnecessary at block 1112, the method 1100 can proceed to block 1102 to receive the next request.

If it is determined that the remapping is required at block 1112, the method 1100 can proceed to block 1114, at which metadata associated with the page targeted by the write request in the NVDIMM can be updated. At block 1116, the space occupied by the page on LE SSD can be released. By the method 1100, the dirty page can be stored in a SSD with high endurance in the form of RAID-1 group, so as to ensure that there is no dirty data loss when one SSD fails.

Figure 12:
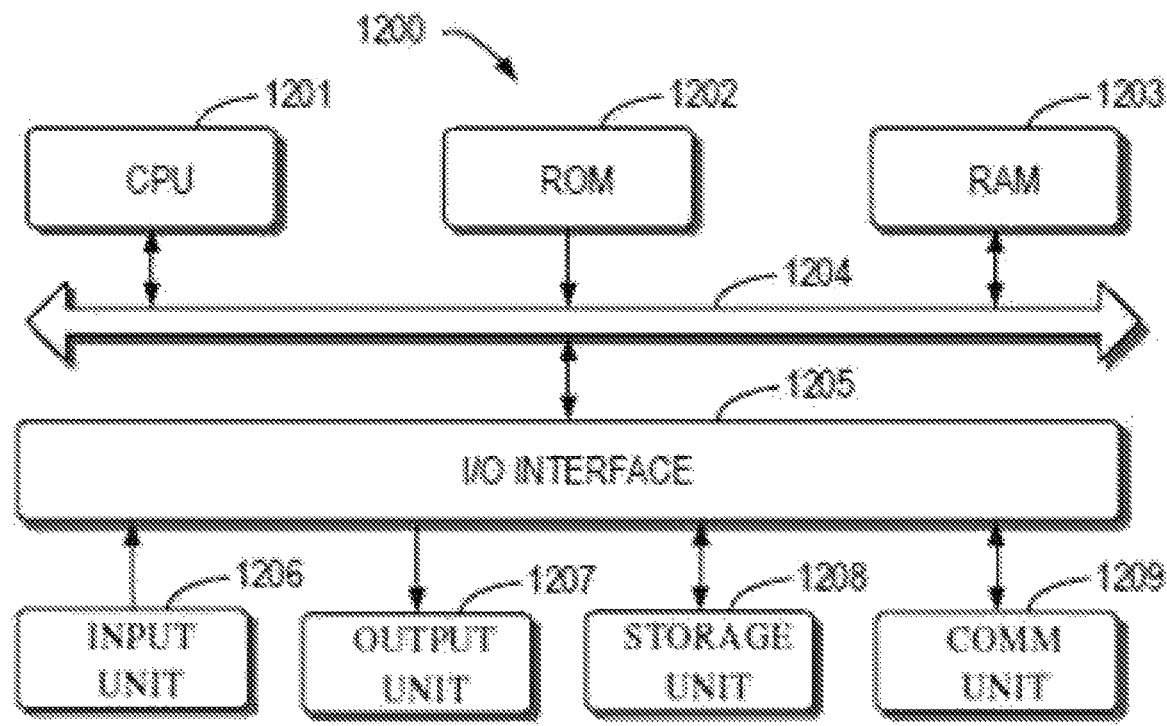
FIG. 12 illustrates a schematic block diagram of an example device for implementing embodiments of the present disclosure.

FIG. 12 illustrates a schematic block diagram of an example device 1200 for implementing embodiments of the present disclosure. As shown in FIG. 12, the device 1200 comprises a central process unit (CPU) 1201, which can execute various suitable actions and processing based on the computer program instructions stored in the read-only memory (ROM) 1202 or computer program instructions loaded in the random-access memory (RAM) 1203 from a storage unit 1208. The RAM 1203 can also store all kinds of programs and data required by the operation of the device 1200. CPU 1201, ROM 1202 and RAM 1203 are connected to each other via a bus 1204. The input/output (I/O) interface 1205 is also connected to the bus 1204.

A plurality of components in the device 1200 is connected to the I/O interface 1205, including: an input unit 1206, such as keyboard, mouse and the like; an output unit 1207, e.g., various kinds of display and loudspeakers etc.; a storage unit 1208, such as disk and optical disk etc.; and a communication unit 1209, such as network card, modem, wireless transceiver and the like. The communication unit 1209 allows the device 1200 to exchange information/data with other devices via the computer network, such as Internet, and/or various telecommunication networks.

The processing unit 1201 executes the above described various methods and processing, such as method 700, method 800, method 900 or method 1100. For example, in some embodiments, method 700, method 800, method 900 or method 1100 can be implemented as a computer software program tangibly included in the machine-readable medium, e.g., storage unit 1208. In some embodiments, the computer program can be partially or fully loaded and/or mounted to the apparatus 1200 via ROM 1202 and/or communication unit 1209. When the computer program is loaded to RAM 1203 and executed by the CPU 1201, one or more actions of the above described method 700, method 800, method 900 or method 1100 can be implemented. Alternatively, the CPU 1201 can be configured to execute method 700, method 800, method 900 or method 1100 through any other appropriate manners (such as by means of the firmware) in other embodiments.

Those skilled in the art should understand that each step of the above method of the present disclosure can be implemented by a general-purpose computing apparatus. They can be integrated on a single computing apparatus, or distributed on a network consisting of a plurality of computing apparatuses. Optionally, they can be implemented using the executable program codes of the computing apparatus, such that they are stored in the storage apparatus for the execution by the computing apparatus, or they are respectively manufactured into various integrated circuit modules, or multiple modules or steps in them are manufactured into a single integrated circuit module for implementation. Thus, the present disclosure is not restricted to any particular combinations of hardware and software.

It should be understood that although the above detailed description mentions several apparatuses or sub-apparatuses of the device, the division is only exemplary rather than being compulsory. In fact, features and functions of the above described two or more apparatuses can be materialized in one apparatus according to the embodiments of the present disclosure. On the contrary, features and functions of the above described one apparatus can be further divided and materialized by several apparatuses.

The above description is only optional embodiments of the present disclosure, which does not restrict the present disclosure. For those skilled in the art, the present disclosure can have various modifications and alterations. Any amendments, equivalent substitutions, improvements and the like should be encompassed within the protection scope of the present disclosure as long as they are within the spirit and principle of the present disclosure.

We claim:

1. A method of storage management, comprising:
   determining whether a number of I/O requests for a first page in a disk of a storage system exceeds a first threshold;
   in response to determining that the number exceeds the first threshold,
      caching data in the first page to a first cache of the storage system;
      storing metadata associated with the first page in a Non-Volatile Dual-In-Line Memory Module (NVDIMM) of the storage system; and
   in response to receiving a write request for the cached first page,
      caching the data in the first page to a second cache of the storage system;
      releasing space occupied by the data in the first page on the first cache;
      writing data related to the write request into the second cache; and
      updating the metadata associated with the first page in the NVDIMM.

2. The method of claim 1, wherein the first cache comprises a solid-state disk with first endurance and the second cache comprises at least two solid-state disks with second endurance organized into a Redundant Array of Independent Disks (RAID), the second endurance being higher than the first endurance.

3. The method of claim 2, wherein the first cache is a read-preference cache, and the second cache is a write cache.

4. The method of claim 1, wherein updating the metadata associated with the first page comprises:
   changing status of the first page to be dirty; and
   modifying mapping information associated with the first page to indicate that the first page is mapped to the second cache.

5. The method of claim 1, further comprising:
   in response to a number of cached pages on the second cache exceeding a second threshold, flushing the cached pages to the disk; and
   changing status of the cached pages to be clean.

6. The method of claim 1, further comprising:
   in response to a number of cached pages on the second cache exceeding a third threshold, limiting a number of write requests to enter the second cache.

7. The method of claim 6, wherein limiting the number of write requests to enter the second cache comprises one of:
   sending to an upper layer driver an indication to limit the number of write requests to enter the second cache; and
   delaying responding to a write request entering the second cache.

8. The method of claim 1, wherein the second cache is formed from storage provided by a set of solid state disks (SSDs); and
   wherein the method further comprises:
      loading, as the first page, user data from storage provided by a set of hard disk drives (HDDs) into the second cache in response to an I/O request; and
   wherein the set of SSDs and the set of HDDs reside in a same disk array.

9. A storage system, comprising:
   a Non-Volatile Dual-In-Line Memory Module (NVDIMM);
   a disk
   a first cache;
   a second cache; and
   a controller configured to:
      determine whether a number of I/O requests for a first page in the disk exceeds a first threshold;
      in response to determining that the number exceeds the first threshold,
         cache data in the first page to the first cache; and
         store metadata associated with the first page in the NVDIMM; and
      in response to receiving a write request for the cached first page,
         cache the data in the first page to the second cache;
         release space occupied by the data in the first page on the first cache;
         write data related to the write request into the second cache; and
         update the metadata associated with the first page in the NVDIMM.

10. The storage system of claim 9, wherein the first cache comprises a solid-state disk with first endurance and the second cache comprises at least two solid-state disks with second endurance organized into a Redundant Array of Independent Disks (RAID), the second endurance being higher than the first endurance.

11. The storage system of claim 10, wherein the first cache is a read-preference cache, and the second cache is a write cache.

12. The storage system of claim 9, wherein updating the metadata associated with the first page comprises:
    changing status of the first page to be dirty; and
    modifying mapping information associated with the first page to indicate that the first page is mapped to the second cache.

13. The storage system of claim 9, wherein the controller is further configured to:
    in response to a number of cached pages on the second cache exceeding a second threshold, flush the cached pages to the disk; and
    change status of the cached pages to clean page.

14. The storage system of claim 9, wherein the controller is further configured to:
    in response to a number of cached pages on the second cache exceeding a third threshold, limiting a number of write requests to enter the second cache.

15. The storage system of claim 14, wherein limiting the number of write requests to enter the second cache comprises one of:
    sending to an upper layer driver an indication to limit the number of write requests entering the second cache; and
    delaying responding to a write request entering the second cache.

16. The storage system of claim 9, wherein the storage system further comprises a set of hard disk drives (HDDs);
    wherein the second cache is formed from storage provided by a set of solid state disks (SSDs);
    wherein the set of SSDs and the set of HDDs reside in a same disk array of the storage system; and
    wherein the controller is further configured to:
       load, as the first page, user data from storage provided by the set of HDDs into the second cache in response to an I/O request.

17. A computer program product for storage management, the computer program product comprising:
    a non-transitory computer readable medium encoded with computer-executable code, the code configured to enable the execution of:

determining whether a number of I/O requests for a first page in a disk of a storage system exceeds a first threshold;

in response to determining that the number exceeds the first threshold, caching data in the first page to a first cache of the storage system; and storing metadata associated with the first page in a Non-Volatile Dual-In-Line Memory Module (NVDIMM) of the storage system; and in response to receiving a write request for the cached first page, caching the data in the first page to a second cache of the storage system;

releasing space occupied by the data in the first page on the first cache;

writing data related to the write request into the second cache; and updating the metadata associated with the first page in the NVDIMM.

18. The computer program product of claim 17, wherein the first cache comprises a solid-state disk with first endurance and the second cache comprises at least two solid-state disks with second endurance organized into a Redundant Array of Independent Disks (RAID), the second endurance being higher than the first endurance.

19. The computer program product of claim 18, wherein the first cache is a read-preference cache, and the second cache is a write cache.

20. The computer program product of claim 17, wherein the second cache is formed from storage provided by a set of solid state disks (SSDs); and wherein the code further configured to enable the execution of:

loading, as the first page, user data from storage provided by a set of hard disk drives (HDDs) into the second cache in response to an I/O request; and wherein the set of SSDs and the set of HDDs reside in a same disk array.

\* \* \* \* \*